United States Patent [19] [11] Patent Number: 5,014,258
Takemasa et al. [45] Date of Patent: May 7, 1991

[54] DISC PLAYER HAVING MEANS FOR PREVENTING DISC MAGAZINE FROM BEING INSERTED UPSIDE DOWN

[75] Inventors: Kaoru Takemasa; Akira Takahashi; Masahiko Kawamura; Sigeo Maruyama; Tokushige Kon, all of Kawagoe, Japan

[73] Assignee: Pioneer Electronic Corp., Tokyo, Japan

[21] Appl. No.: 366,391

[22] Filed: Jun. 15, 1989

[30] Foreign Application Priority Data

Oct. 3, 1988 [JP] Japan .................................. 63-247518
Oct. 31, 1988 [JP] Japan .................................. 63-273338

[51] Int. Cl.⁵ ............................................. G11B 23/03
[52] U.S. Cl. ..................................... 369/178; 360/133; 360/97.01; 369/36; 369/192
[58] Field of Search ...................... 369/34, 35, 36, 178, 369/192, 201, 202; 360/97.01, 97.03, 98.01, 98.06, 99.06, 133

[56] References Cited

U.S. PATENT DOCUMENTS 4,745,500  5/1988  Davis .................................... 369/133
4,788,673  11/1988  Ikedo et al. ............................ 369/36
4,864,551  9/1989  Tomita et al. .......................... 369/36
4,876,619  10/1989  Suzuki ................................... 369/133

Primary Examiner—William M. Shoop, Jr.
Assistant Examiner—John W. Cabeca
Attorney, Agent, or Firm—Sughrue, Mion, Zinn, Macpeak & Seas

[57] ABSTRACT

A multi-disc player having means for preventing a disc magazine from being inserted upsidedown. The disc player includes a magazine holder, means for taking a disc tray out of a magazine accommodated in the holder, a turntable, a disc clamper and playback means. The magazine has a front face formed with a surface at one portion and formed with a stepped portion at another portion. The preventing means includes a magazine ejector arm pivotally supported on the magazine holder, and a biasing spring for urging the ejector arm in a direction to eject the magazine out of the magazine holder. If the magazine ejector arm is in contact with the surface, the ejector arm can be fully pivotted because of manual pushing force applied to the magazine. However, if the magazine ejector arm is in contact with the stepped portion due to the insertion of the magazine upsidedown, the ejector arm is lockingly engaged with the stepped portion to terminate its pivotal motion prior to reaching its fully pivotted position.

1 Claim, 12 Drawing Sheets

 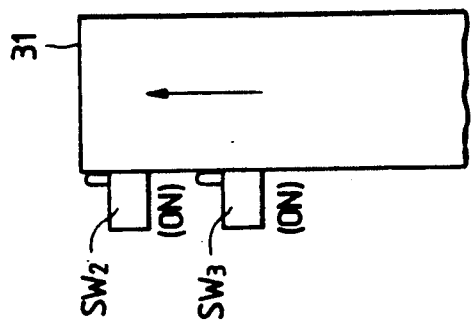
FIG. 13(d)
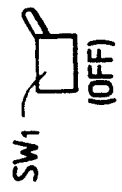 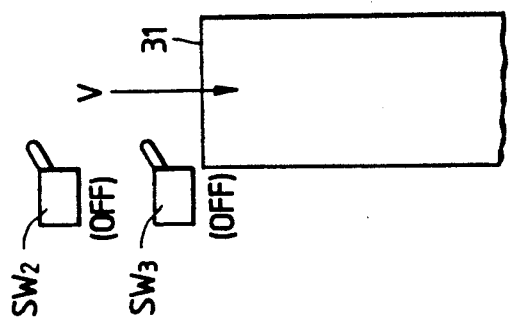
FIG. 13(c)
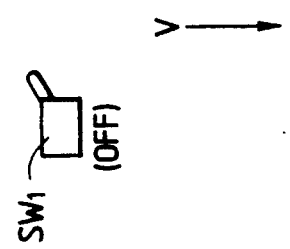 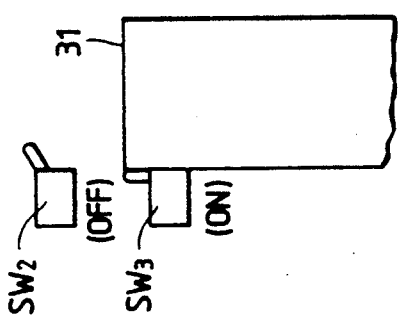
FIG. 13(b)
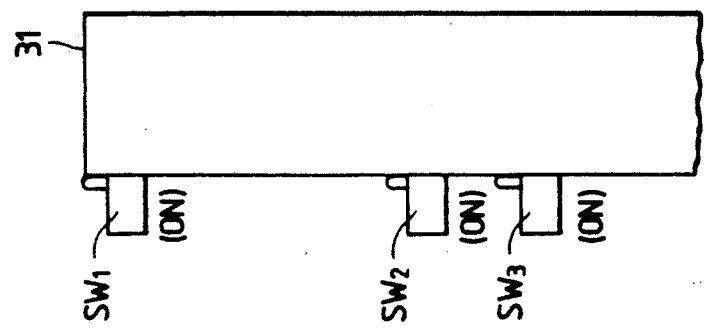
FIG. 13(a)

DISC PLAYER HAVING MEANS FOR PREVENTING DISC MAGAZINE FROM BEING INSERTED UPSIDEDOWN

BACKGROUND OF THE INVENTION

The present invention relates to a disc player, and more particularly to means for preventing a magazine from being inserted upside down into a magazine holder in a player housing of the disc player.

Generally, a magazine storing therein a plurality of discs is accommodatable in a player housing of a disc player, and one of the discs mounted on a disc tray is movably drawn out of the magazine and moved together with the tray into a playback unit of the disc player for reproduction.

One conventional disc player which is employed as a multidisc player for use on an automobile, is shown in FIG. 1. The multidisc player includes a player housing B placed in the trunk $A_1$ of an automobile A and a magazine C loaded in the player housing B.

The magazine C has a plurality of disc trays $C_1$ angularly movably supported in a case $C_3$ by a shaft $C_2$, each of the disc trays $C_1$ having a recess $C_1'$ for placing a disc D therein. The case $C_3$ has a window $C_5$ defined in a side wall thereon near the shaft $C_2$. With the magazine C set in the player housing B, one at a time of the disc trays $C_1$ is angularly pushed out of the case $C_3$ by an ejector lever (not shown) supported in the player housing B and projectable into the case $C_3$ through the window $C_5$. The case $C_3$ also has an engagement recess $C_4$ defined in the side wall thereof for holding the case $C_3$ in the player housing B.

The player housing B is electrically connected through a cable E to a remote control unit F mounted on a dashboard $A_2$ of the automobile A.

In operation, the magazine C is inserted and set in the player housing B, and the remote control unit F is operated to pivotally move one of the disc trays $C_1$ with a desired disc D thereon out of the case $C_3$. The disc D on the projected disc tray $C_1$ is then held by a clamper (not shown) and rotated about its own axis for being played back by a pickup (not shown).

According to the above-described multidisc player, a desired one of the disc trays $C_1$ can be taken out of the case $C_3$ after the magazine C has been inserted into a magazine holder (described below) in the player housing B. Heretofore, the user of a disc player often erroneously inserts a disc magazine in an inverted posture, i.e., upside down, into a magazine holder in a player housing.

If the magazine is inserted upside down, then none of disc trays in the magazine can be taken out of a case in the magazine, undue stresses are imposed on mechanical parts in the disc player, and the magazine once inserted cannot be unloaded from the player housing.

SUMMARY OF THE INVENTION

In view of the aforesaid drawbacks of the conventional disc player, it is an object of the present invention to provide a disc player having a means for preventing a disc magazine from being inserted upside down into a magazine holder through locking engagement of a magazine ejector arm with a step on the front surface of the magazine.

In accordance with the present invention there is provided means for preventing a disc magazine from being inserted upside down into a disc player, the disc player including a magazine holder, the magazine for holding at least one disc tray for placing a disc thereon, the magazine being insertable into the magazine holder, means for taking the disc tray out of the magazine which is inserted in the magazine holder, a turntable, and playback means for playing back the disc; the means for preventing comprising: a magazine ejector arm pivotally disposed in the magazine holder, biasing means connected to the magazine ejector arm for normally urging the arm to a direction to eject the magazine out of the magazine holder, and the magazine being provided with a front end having one portion formed with a surface slidingly contactable with the magazine ejector arm and another portion formed with a step, the ejector arm providing a full pivoting stroke upon slide contact with the surface against the biasing force of the biasing means to allow the magazine to be fully inserted into the magazine holder, and the magazine ejector arm providing an intermediate pivot position upon locking engagement with said step for preventing the magazine from being further inserted into the magazine holder.

According to the present invention, the magazine ejector arm is angularly movably disposed in the magazine holder and normally urged by the spring in a direction to eject a magazine out of the magazine holder. The magazine ejector arm is angularly movable by the magazine against the bias of the spring to allow the magazine to be inserted when the magazine is normally inserted into the magazine holder. The magazine ejector arm is positioned for engagement with a step on the front surface of the magazine and is prevented from being further angularly moved when the magazine is inserted upside down into the magazine holder, for thereby locking and preventing the magazine from being further inserted into the magazine holder.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 13(a)-13(d) show positional relationship between switches and an upper slide plate according to this invention.

DETAILED DESCRIPTION OF THE PREFERRED EMBODIMENT

A player housing B according to one embodiment of this invention will be described with reference to FIGS. 2 thru 4. In the following description, means for preventing a disc magazine from being inserted upside down according to the present invention will also be described with reference to FIGS. 5 and 6.

Figure 2:
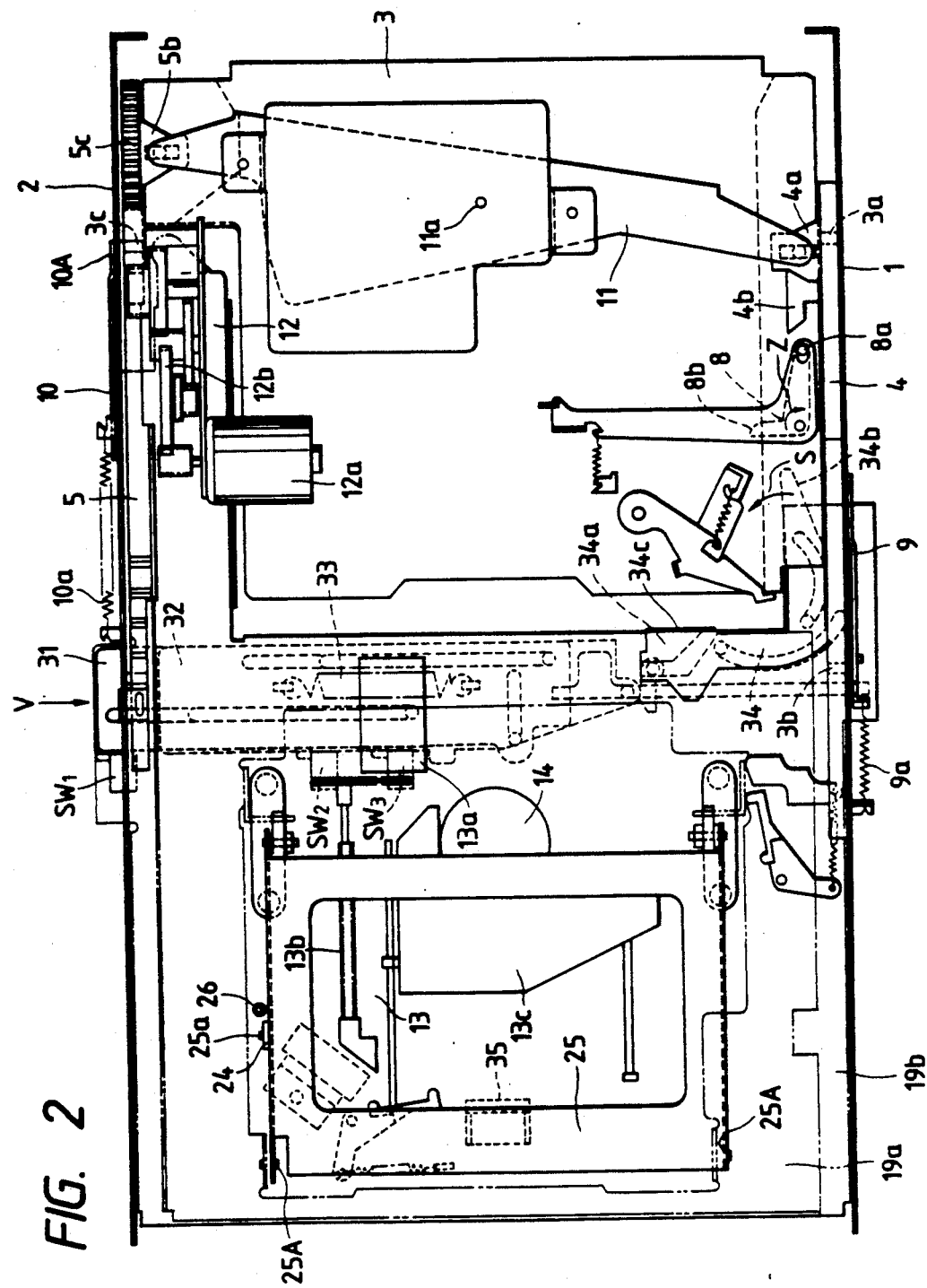
FIG. 2 is a plan view showing a mechanism in an upper half portion of a player housing of a disc player according to the present invention.
Figure 4:
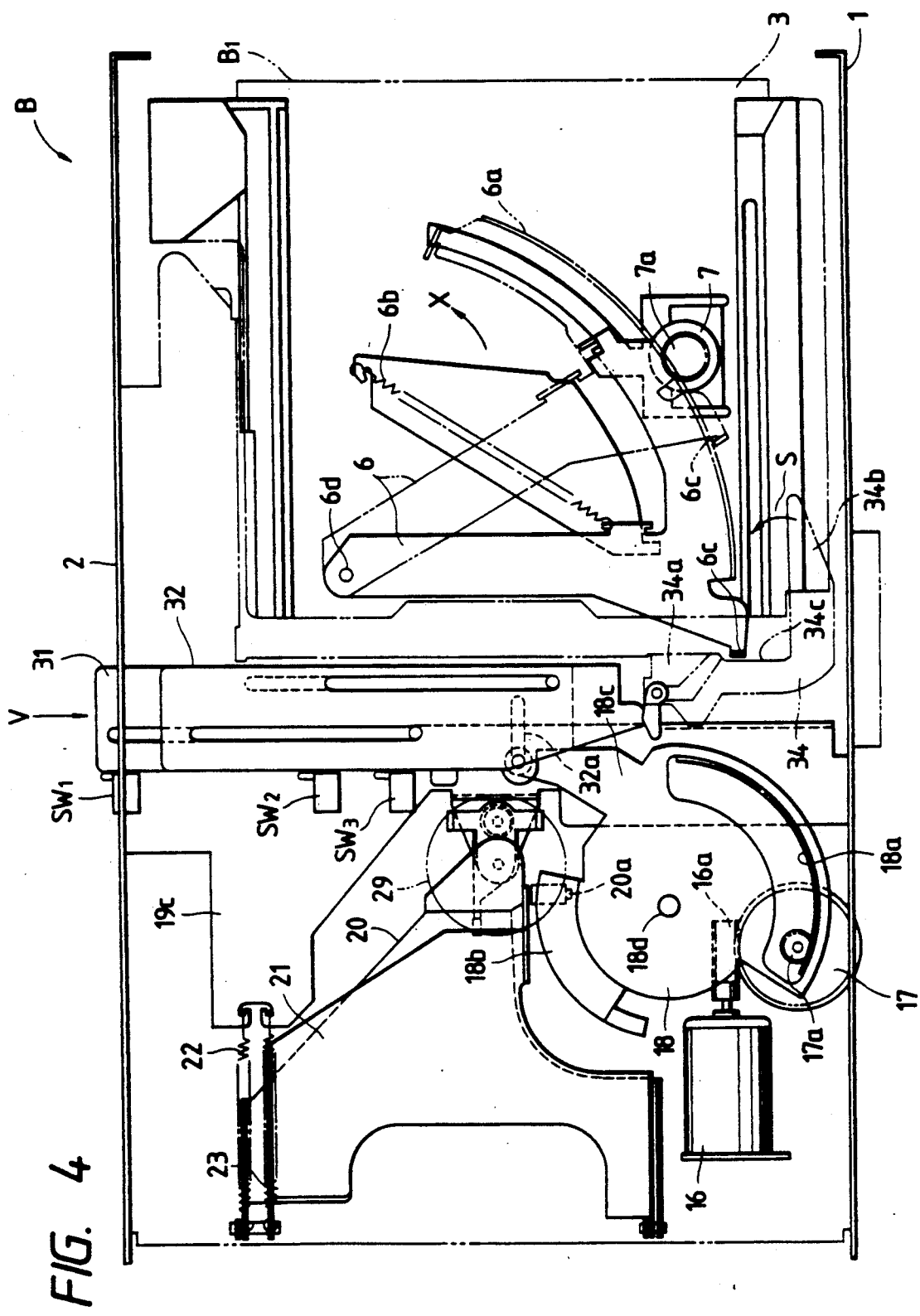
FIG. 4 is a plan view showing the mechanism in the player housing, and in which an upper half portion thereof is removed.

In FIGS. 2 and 4, the player housing B includes a pair of laterally spaced side panels 1, 2, a magazine holder 3 disposed between the side panels 1, 2, and slide plates 4, 5. The magazine holder 3 has a box shape configuration including upper and lower walls and lateral side walls for receiving therein a magazine C. Further, guide pins 3a, 3b, 3c horizontally extend from the lateral side walls and extend through the slide plates 4, 5 and the side panels 1, 2. The magazine holder 3 is positioned between the side panels 1 and 2 through the slide plates 4 and 5. The side plates 4 and 5 are slidably disposed in a horizontal direction with respect to the side panels 1, 2.

As best shown in FIG. 4, a generally L-shaped magazine ejector arm 6 has one end portion provided with a sector gear 6a and has another end portion 6d pivotally supported on a lower surface of the magazine holder 3. The magazine ejector arm 6 is normally biased by a spring 6b in a direction to eject the magazine out of the magazine holder 3, i.e., in a direction indicated by an arrow X in FIG. 4.

Figure 1:
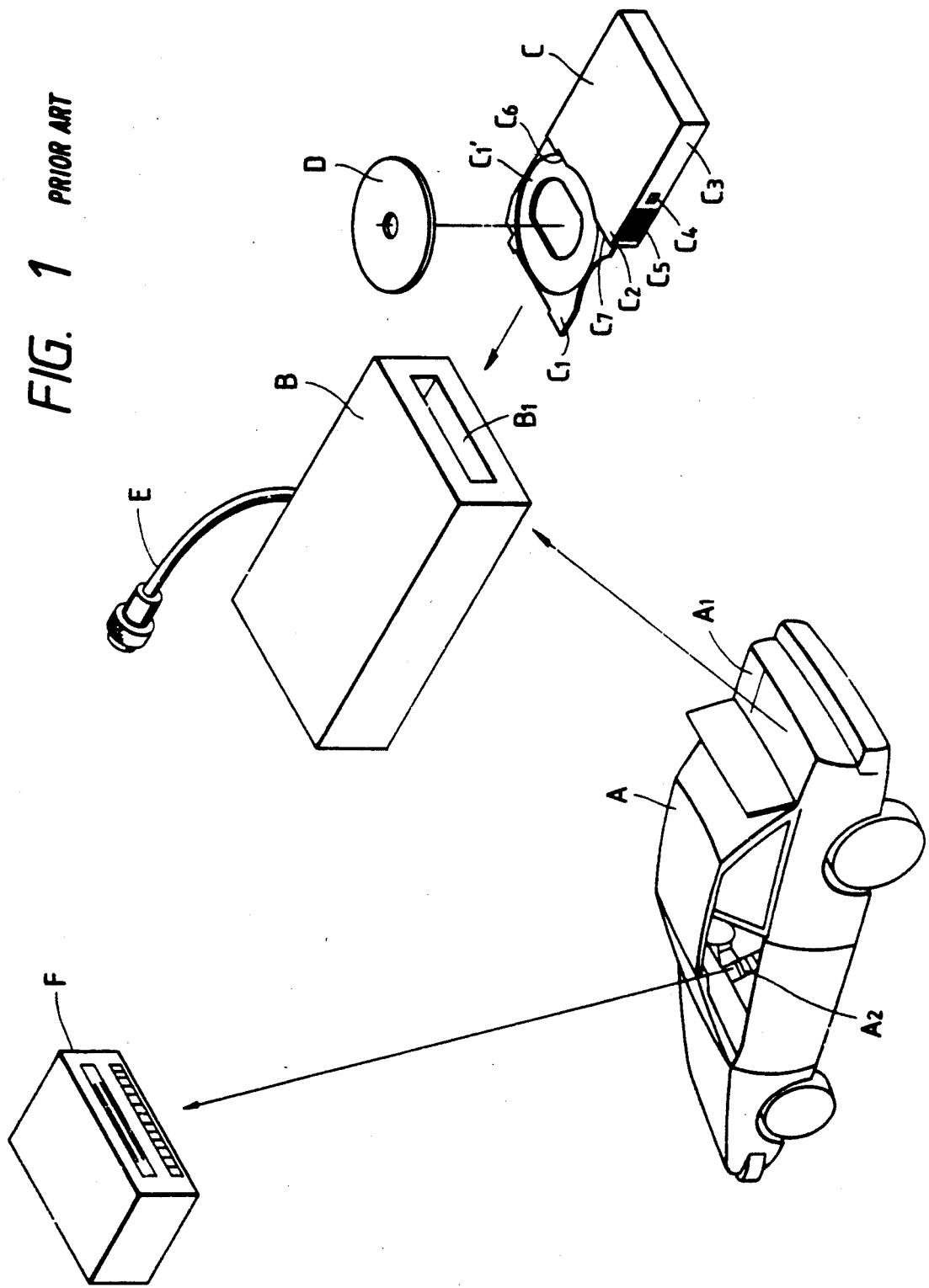
FIG. 1 is a perspective view showing a general multidisc player for use on an automobile.

The magazine ejector arm 6 has an upstanding member 6c integrally formed thereon near an end of the gear 6a. When the magazine C (FIG. 1) is inserted into the magazine holder 3 through an opening B1 thereof, the front flat of the magazine C abuts against the upstanding member 6c. As the magazine C is further pushed in, the upstanding member 6c and hence the magazine ejector arm 6 are turned against the bias of the spring 6b until the magazine C is fully inserted and set into place in the magazine holder 3.

Figure 5:
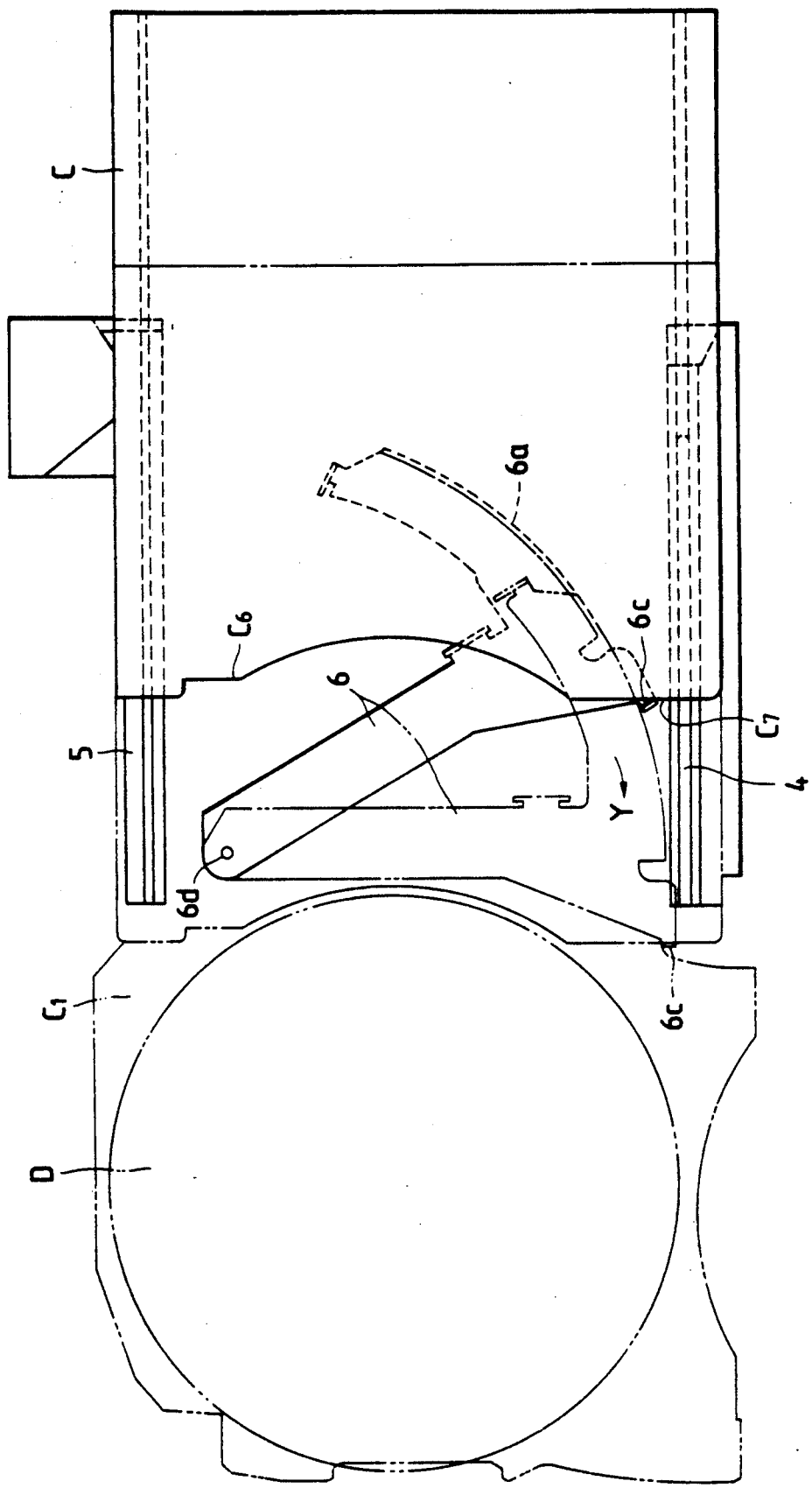
FIG. 5 is a plan view showing a magazine holder in the player housing, and in which a magazine is normally inserted.
Figure 6:
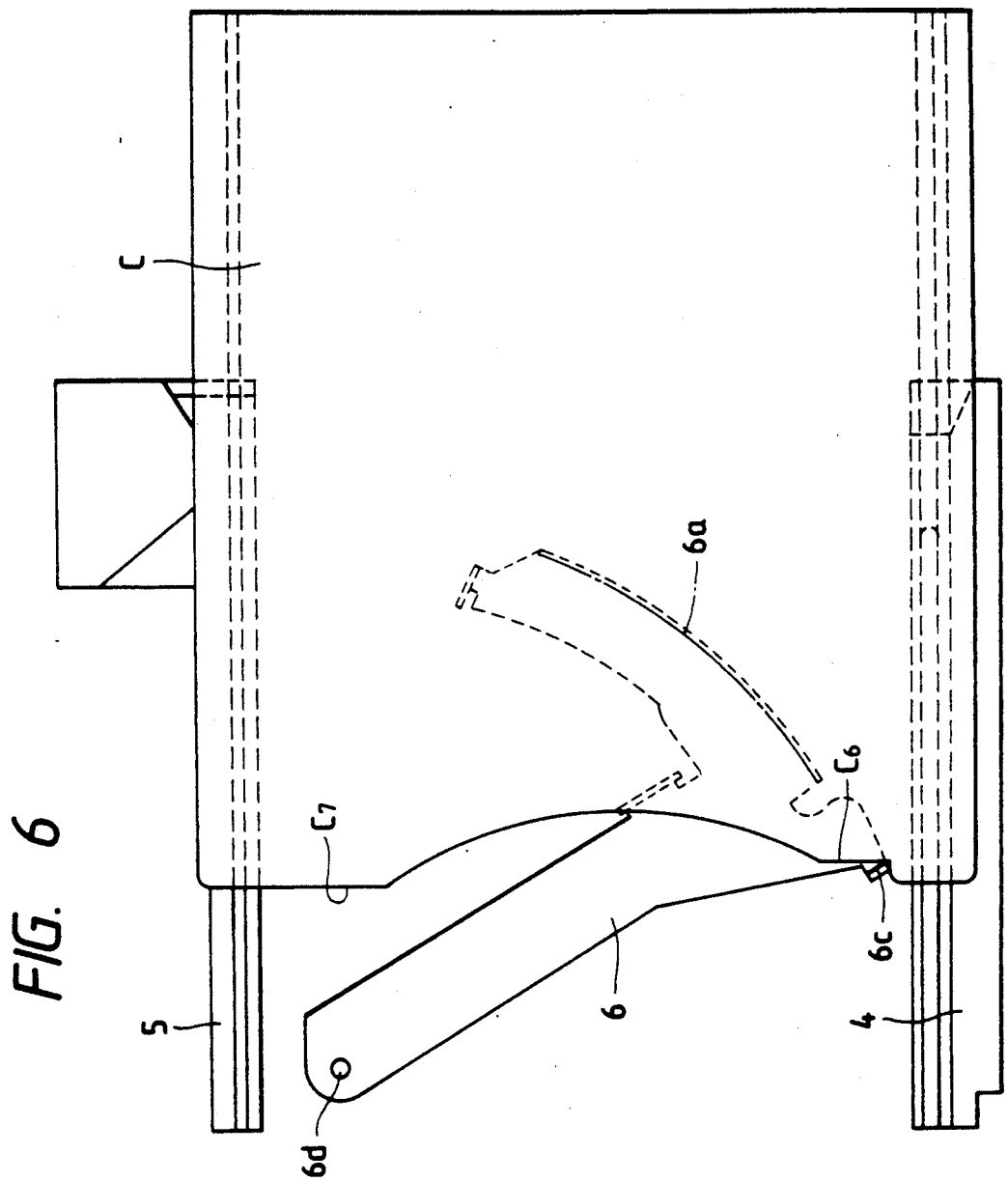
FIG. 6 is a plan view showing the magazine holder when a magazine is erroneously inserted therein.

When the magazine C is normally inserted into the magazine holder 3 in a correct orientation, the upstanding member 6c faces a flat surface $C_7$ of the magazine C as shown in FIG. 5. Therefore, as the magazine C is pushed in, the upstanding member 6c slides on the flat surface $C_7$ of the magazine C and the magazine ejector arm 6 is pivotted about the pivot portion 6d in a direction indicated by an arrow Y in FIG. 5. If the magazine C is inserted upside down, however, the upstanding member 6c engages a step $C_6$ (FIGS. 1 and 6) on the front surface of the magazine C and is locked thereby. Therefore, the magazine ejector arm 6 cannot be further turned as shown in FIG. 6, thus preventing the magazine C from being further inserted in the Y direction. Accordingly, the magazine C is prevented from being inserted upside down, and any malfunction of the disc player which would otherwise result from the erroneous insertion of the magazine C is avoidable.

Further, as shown in FIG. 4, the gear 6a of the magazine ejector arm 6 is in meshing engagement with a gear 7a mounted on a rotary damper 7 disposed on the lower surface of the magazine holder 3. The rotary damper 7 serves to allow the magazine ejector arm 6 to return at a reduced speed in the X direction under the bias of the spring 6b. In other words, the rotary damper 7 provides a repulsive force against the biasing force of the spring 6b for moderating return speed of the arm 6. Therefore, the inserted magazine C can be slowly ejected from the magazine holder 3 in the slow down motion of the arm 6 in X direction.

As best shown in FIG. 2, an engaging arm 8 is pivotally mounted on the magazine holder 3 and normally urged by a spring to project from the side wall into the interior space in the magazine holder 3. More specifically, the engaging arm 8 has generally L-shaped configuration having an arm portion 8b engageable with the hole $C_4$, and one end portion provided with a projection 8a. The arm portion 8b is normally urged in a direction opposite a direction Z in FIG. 2. When the magazine C is fully inserted and set in the magazine holder 3, the arm portion 8b of the engaging arm 8 engages the hole $C_4$ formed in the side wall of magazine C to lock the magazine C in the magazine holder 3.

Figure 3:
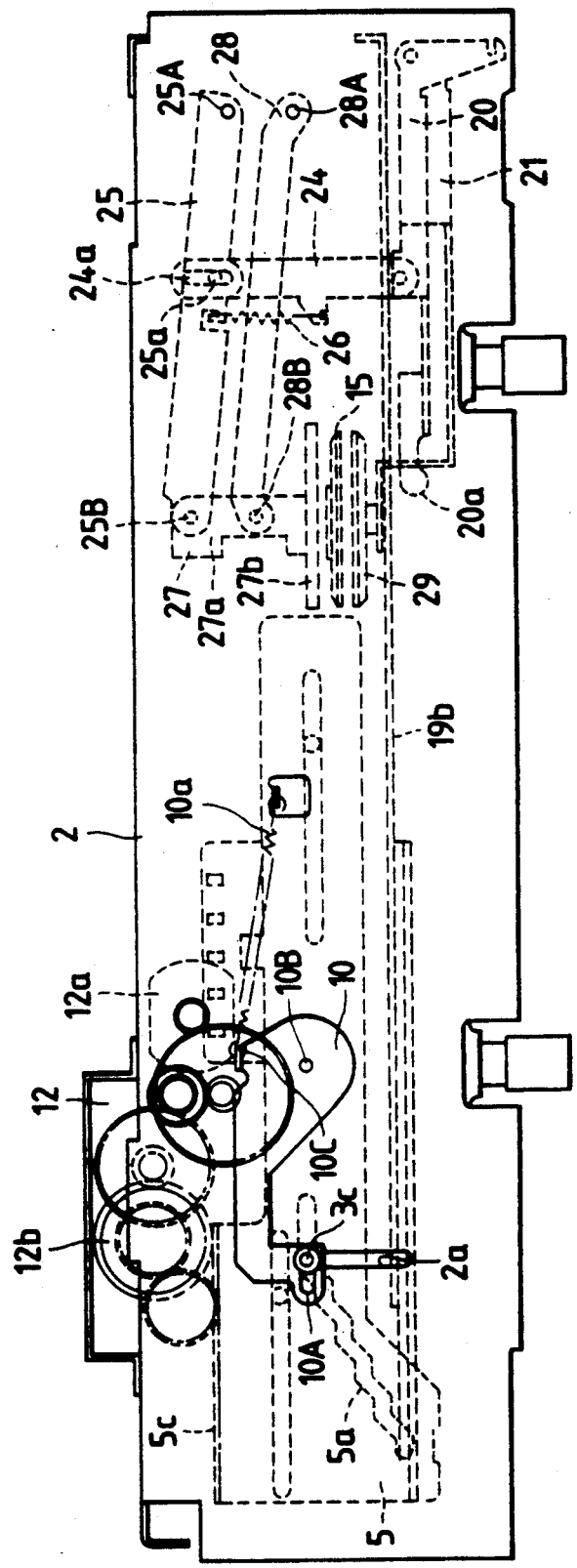
FIG. 3 is a side elevational view showing the player housing.

As best shown in FIG. 3, the slide plates 4, 5 interposed between the side panels 1, 2 and the magazine holder 3 have staircase-shaped cam grooves 5a in which the guide pins 3a through 3c projecting from the side walls of the magazine holder 3 are inserted, respectively. Only the cam groove 5a defined in the slide plate 5 is shown in FIG. 3, but those cam grooves defined in the slide plate 4 and receiving the guide pins 3a, 3b are not illustrated. The slide plates 4, 5 are supported horizontally slidably with respect to the side panels 1, 2 as described above. Further, the side panels 1 and 2 are formed with vertical slots 2a. The guide pins 3a through 3c extend through the respective cam grooves (for example 5a) in the slide plates 4, 5 into the vertical slots defined in the side panels 1, 2. Only the vertical slot 2a defined in the side panel 2 is shown in FIG. 3, but those vertical slots defined in the side panel 1 are omitted from illustration.

As shown in FIGS. 2 and 3, turn plates 9, 10 are pivotally mounted on outer surfaces of the side panels 1, 2. Ends (for example 10A in FIG. 3) of the turn plates 9, 10 are in engagement with the guide pins 3b, 3c projecting out of the side panels 1, 2. The guide pins 3b, 3c are normally biased upwardly by springs 9a, 10a acting between the side panels 1, 2 and another ends of the turn plates 9, 10. Thus, the magazine holder 3 is normally biased upwardly.

As shown in FIG. 2, a synchronizing plate 11 is pivotally supported at its substantially central portion 11a on the upper surface of the magazine holder 3. The synchronizing plate 11 has opposite ends engaging respective tabs 4a, 5b projecting inwardly from the slide plates 4, 5, respectively. When one of the slide plates 4, 5 is moved at a speed in one direction, the remaining one of the slide plate 5 and 4 is moved at the same speed in the opposite direction by the synchronizing plate 11 because of the pivotal motion thereof.

As shown in FIGS. 2 and 3, a slide plate driver unit 12 is provided for moving the slide plate 5. This unit 12 includes a motor 12a and a speed reducer gear train 12b.

The speed reducer gear train 12b includes a final gear meshedly engaged with a rack 5c on the upper surface of the slide plate 5.

When the motor 12a of the slide plate driver 12 is energized, it causes the speed reducer gear train 12b to move the slide plates 5 horizontally. At the same time, the guide pin 3 guided in the cam groove 5a of the slide plate 5 is vertically moved because it is also guided in the vertical slot 2a defined in the side panel 2. When the slide plate 5 starts moving, the slide plate 5 is also moved in the opposite horizontal direction by the synchronizing plate 11. Therefore, the guide pins 3a, 3b guided in the respective cam grooves in the slide plate 4 are vertically moved. Accordingly, the magazine holder 3 is vertically moved by the vertical movement of the guide pins 3a through 3c, since these pins are integral with the magazine holder 3.

When the slide plate 4 reaches the stroke end of its leftward movement in FIG. 2 (at this time, the magazine holder 3 is in the uppermost position), a finger 4b on the slide plate 4 pushes the projection pin 8a on the engaging arm 8 to turn the engaging arm 8 clockwise (in Z-direction in FIG. 2). As a result, the arm portion 8b is disengaged from the hole $C_4$ in the magazine C. The magazine C is now released, and can be slowly ejected by the magazine ejector arm 6 because of the biasing force of the spring 6b and the damper 7.

The magazine C is inserted into and discharged out of the magazine holder 3, and the magazine holder 3 is vertically moved, in the manner described above.

Next, descriptions will be given with respect to play back operation of the disc player by drawing a disc D out of the magazine C which is set in the magazine holder 3.

As illustrated in FIG. 2, a pickup driver 13 includes a pickup motor 13a, a screw rod 13b rotatable about its own axis by the pickup motor 13a, and a pickup 13c movable in response to rotation of the screw rod 13b. A turntable 15 (FIG. 3) is rotated about its own axis by a turntable motor 14.

As illustrated in FIG. 4, first and second chassis 19a and 19b are provided. The side panels 1 and 2 are connected to each other by the second chassis 19b, and the first chassis 19a is disposed above the second chassis 19b and is spacedly fixed thereto through a spacer (not shown). The first and second chassises 19a and 19b define a space therebetween for allowing the selected disc tray and the disc to be positioned in the space for playback operation. A control cam drive motor 16 is fixed to a lower surface of the first chassis 19a (see also FIGS. 2 and 7, it should be noted that upper half portion including the first chassis 19a of the player housing is removed in FIG. 4 for simplicity) for driving a control cam 18 (described later). The control cam drive motor 16 has an output shaft on which there is fixedly mounted a worm 16a meshing with a worm wheel 17 for rotating the same. A small gear 17a which is integrally and coaxially formed with the worm wheel 17 is held in mesh with an internal a sector gear 18a provided on the control cam 18.

The control cam 18 is rotatably mounted on a shaft 18d implanted on the second chassis 19b. The control cam 18 has a cam surface 18b positioned diametrically opposite to and positionally higher than the internal sector gear 18a. The control cam 18 also has an integral control projection 18c disposed near an end of the internal sector gear 18a.

Figure 7:
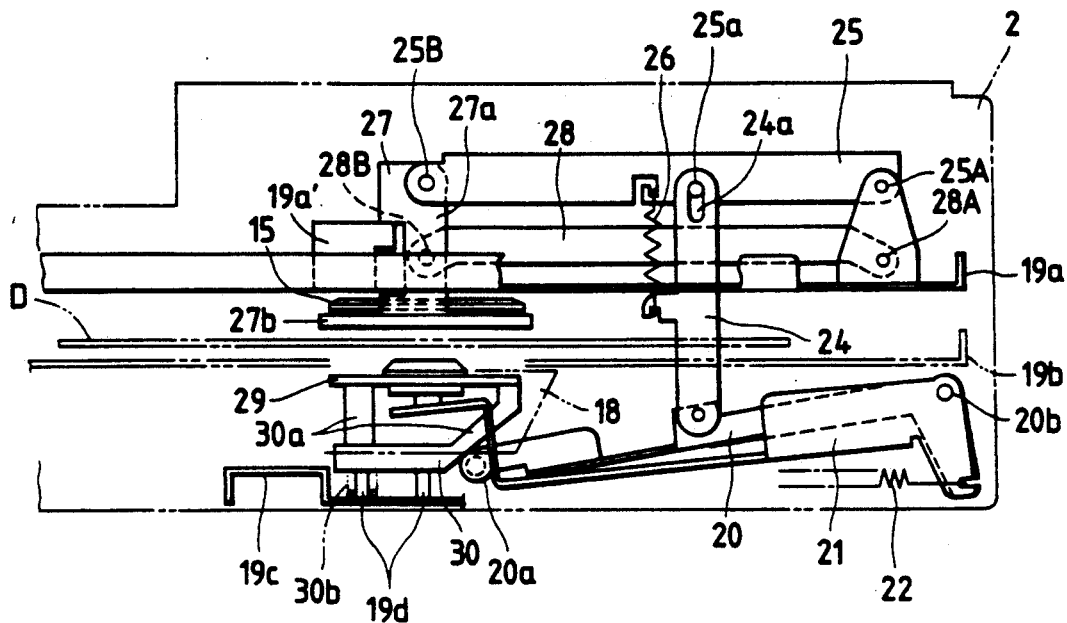
FIG. 7 is a side elevational view showing a disc clamper in the player housing.

As shown in FIGS. 3, 4, 7 and 8, first and second turn plates 20, 21 are pivotally supported on the lower surface of the second chassis 19b at a povot point 20b, and as best shown in FIG. 7, the first turn plate 20 is positioned immediately below the second chassis 19b. A roller 20a rotatably projecting from the first turn plate 20 is held against the cam surface 18b of the control cam 18. Springs 22, 23 are connected under tension between the first and second turn plates 20, 21 and a third chassis 19c positioned below the second chassis 19b for normally urging the turn plates 20, 21 toward the second chassis 19b. Therefore, the roller 20a of the first turn plate 20 is pressed against the cam surface 18b. As shown in FIG. 3, a vertically extending connector arm 24 which extends through the second chassis 19b to a position above the upper surface of the first chassis 19a (FIG. 7) has a lower end portion angularly movably connected to the first turn plate 20. The upper end portion of the connector arm 24 is formed with a slot 24a.

As shown in FIGS. 2, 3, 7 and 8, a third turn plate 25 has one end portion 25A angularly movably supported on the upper surface of the first chassis 19a, and has an intermediate portion provided with a laterally projecting pin 25a inserted into the slot 24a of the connector arm 24. A spring 26 is connected under tension between the third turn plate 25 and the connector arm 24.

A T-shaped disc holder 27 made of synthetic resin has a vertical plate 27a and a holder portion 27b. The vertical plate 27a is rotatably connected to another end portion 25B of the third turn plate 25, and is vertically movable through the turntable 15. The vertical plates 27a of the disc holders 27 is abuttable on an upstanding stop member 19a' (FIGS. 7 and 8) lanced from the first chassis 19a for limiting the downward movement of the disc holders 27. Further, a parallel arm 28 is positioned below the third turn plate 25. The parallel arm 28 has one end 28A pivotally supported on the first chassis 19a and has another end 28B rotatably connected to a substantially intermediate portions of the vertical plate 27a of the disc holder 27. Therefore, when the third turn plate 25 is turned, the holder portion 27b is vertically translated with maintaining its horizontal orientation. The horizontal plate 27b is provided with a dampening member (not shown) such as a felt bonded to the lower surface thereof.

Turning now to the clamping of the disc D for playing back operation, the disc is fixedly interposed between a turntable and a clamper, and it is necessary to maintain the disc in horizontal orientation. In this connection, one conventional clamper is displaced in accordance with the pivotal movement of the turn plate, and the clamper is rotatably and swingably attached to a tip end of the turn plate. With such conventional structure, when the turn plate is pivotally moved for moving the clamper toward the disc, the clamper may be included with respect to the disc, and such slanting clamper is inserted innto a hole of the disc. As a result, the clamper mounting thereon the disc is moved toward the turntable with slanting posture of the clamper. Accordingly, the disc may not be horizontally held between the clamper and the turntable, to thereby render the playing back inoperable.

In the embodiment according to this invention, such conventional drawback is eliminated by maintaining horizontal orientation of the clamper during its travel toward the turntable for clamping the disc. Such horizontal orientation of the clamper can be provided by a clamp support member 30.

Figure 8:
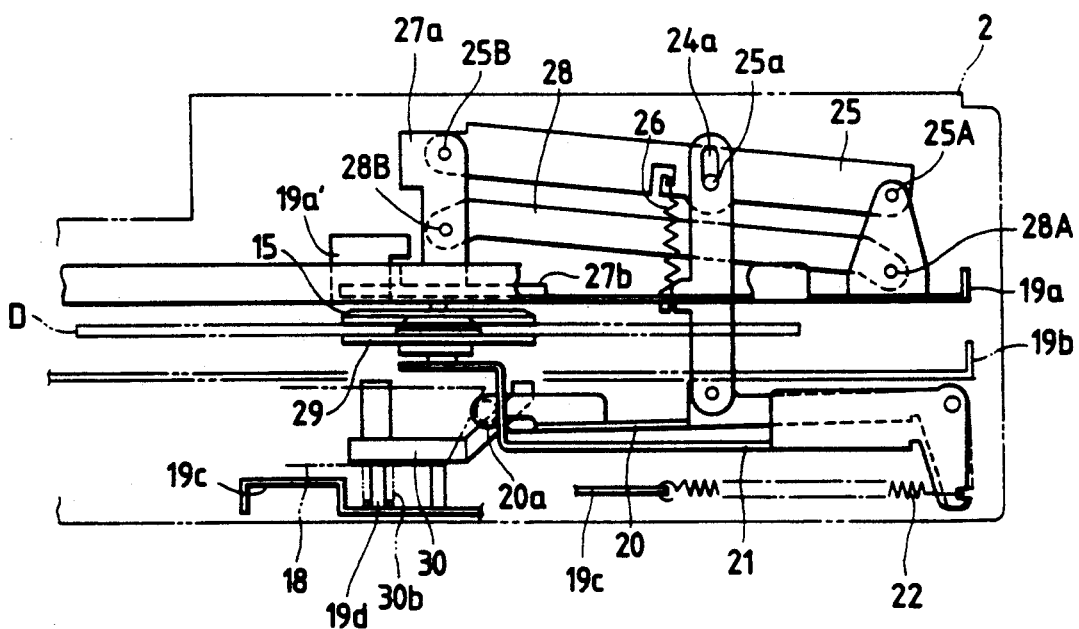
FIG. 8 is a side elevational view showing the disc clamper which is operated to clamp a disc.

More specifically, as shown in FIGS. 7 and 8, a disc clamper 29 is rotatably supported on the distal end of the second turn plate 21, and the clamper 29 is supported by the clamp support member 30. The above described third chassis 19c extends between the side panels 1, 2, and two guide pins 19d implanted vertically on the third chassis 19c extend through the clamp support member 30. The clamp support member 30 has three support posts 30a angularly spaced apart from each other by about 120°. The clamp support member 30 is normally urged toward the disc clamper 29 by a spring 30b disposed around the guide pin 19d to hold the disc clamper 29 horinzontally on the support posts 30a.

When the control cam 18 is rotated by the motor 16 until the roller 20a of the first turn plate 20 rolls off the cam surface 18b of the control cam 18, the first turn plate 20 is turned by the biasing force of the spring 22 to move the disc clamper 29 toward the turntable 15 to clamp the disc D. At the time the disc clamper 29 is thus moved, since the clamp support member 30 is biased toward the disc clamper 29 by the spring 30b, the clamp support member 30 is also moved sliding along the vertically extending guide pins 19d while the member 30 is in contact with the disc clamper 29, thereby holding the disc clamper 29 horizontally until immediately before the disc clamper 29 clamps the disc 29 with respect to the turntable 15. Therefore, the disc clamper 29 is accurately inserted in the central hole of the disc D, and hence the disc D can be clamped between the disc clamper 29 and the turntable 15 without being eccentrically displaced.

With this construction, the clamper support member 30 is normally urged toward the clamper by the biasing force of the spring 30b, and is subjected to guiding by the guide pins 19d. Therefore, when the second turning plate 21 is pivotted for moving the clamper 29 upwardly, the clamper 29 is always supported in its horizontal direction by the clamper support member 30 until the disc D is clamped between the turntable 15 and the clamper 29. As a result, the clamped disc D can provide its horizontal orientation, to thereby obviate playback fault due to clamping error.

As described above, the second turn plate 21 is also biased by the spring 23. However, the pivotal movement of the second turning plate 21 toward the biasing direction is restrained by the first turn plate 20 when the roller 20a is in contact with the cam surface 18b. Here, the turning movement of the first turn plate 20 allows the second turn plate 21 to be turned under the bias of the spring 23. Therefore, the disc clamper 29 is movable upwardly. Upon turning motion of the first turning plate 20, the third turn plate 25 is also turned or pivotted by way of the connector plate 24. The disc holder 27 is, therefore, translated upwardly maintaining its horizontal orientation in cooporation with the parallel arm 28. During upward movement of the clamper 29, the clamper 29 passes through the disc tray C1 and mounts the disc D. During this upward travel of the clamper 29, the upper surface of the disc D is in abutment with the lower surface of the horizontal plate 27b of the disc holder 27. Therefore, the disc D is held between the disc holder 27 and the clamper 29, and these are further moved upwardly toward the turntable 15 with maintaining horizontal orientation of the disc D. After the disc holder 27 passes through the turntable 15, the disc 15 is held between the clamper 29 and the turntable 15. Consequently, the disc D can also be clamped horizontally between the turntable 15 and the disc clamp 29 as shown in FIG. 8.

After play-back operation, the disc D clamped between the clamper 29 and the turntable 15 must be returned back onto the disc tray $C_1$. For this disc return, the clamper must be first moved downwardly for releasing the disc clamping. In this case, if the disc is accidentally inclined and the edge of the disc is latched with the disc tray, the disc cannot be moved correctly onto the disc tray. Alternatively, if adhesive material is accidentally adhered onto the turntable, the disc is not easily separated from the turntable. For avoiding these drawbacks, the disc holder is also moved downwardly in synchronous with the downward movement of the clamper. In this respect, according to one conventional structure, a disc holder is biased by a spring, and the biasing force is only applicable when the clamper moves away from the turntable. In other words, in the conventional structure, the biasing force is not applied during the playback operation and after the disc is correctly mounted on the disc tray.

With such conventional structure, the disc is only urged toward the disc tray by the biasing force of the spring upon completion of the playback. Therefore, if the above-described latching force or adhesion force is larger than the biasing force of the spring, the disc cannot be seated onto the disc tray.

Therefore, as described above, according to the present invention, the disc holder 27 is forcibly moved downwardly because of the mechanical interconnection between the first turning plate 20 and the third turn plate 25 by way of the connector plate 24. Therefore, such conventional drawbacks can be eliminated.

To be more specific, to return the disc D onto the disc tray $C_1$, the first turn plate 20 is turned counterclockwise (in FIG. 7) to lower the disc D. In order to move the disc holders 27 forcibly in synchronous with the movement of the clamper 29 to lower the disc D, the connector plate 24 is interconnected between the first and third turn plates 20 and 25. Further, the third turn plate 25 is further biased by the spring 26 for urging the disc holder 27 downwardly. The upper end of the slot 24a of the connector arm 24 engages the pin 25a when the turn plate 20 is in the lowered position. Incidentially, when the clamper 29 is moved upwardly, the third turn plate 25 is not promptly moved, since it takes several time for abutting the lower end of the slot 24a with the pin 25a. As a result, for loading the disc D on the turntable 15, the disc D can be first interposed between the clamper 29 and the disc holder 27.

With such arrangement, the disc can be moved downwardly onto the disc tray $C_1$ by the disc holder 27 because of the biasing force of the spring 26 if no problem is imposed on the disc. Further, the disc can be forcibly moved downwardly onto the disc tray C1 by the disc holder 27 because of the mechanical interconnection between the disc holder and the clamper even if several problems (accidental disc inclination, adhesion of the disc onto the turntable, etc.) are imposed on the disc.

In the player housing according to the present invention, upper and lower slide plates 31 and 32 are provided as shown in FIGS. 2 and 4. The upper slide plate 31 is attached to the second chassis 19b so as to be movable in a direction parallel thereto, and the lower slide plate 32 is disposed below the upper slide plate 31 so as to be movable parallel thereto. A spring 33 is interposed between the upper and lower slide plates 31, 32 for allowing the upper slide plate 31 to move when the lower slide plate 32 moves. The lower slide plate 32 is formed with a slot 32a with which the control projection 18c of the control cam 18 is engaged. The slot 32a extends in a direction perpendicular to the moving direction V (see FIG. 2) of the lower slide plate 32. Therefore, when the control cam 18 rotates, the lower slide plate 32 is moved to permit the upper slide plate 31 to move in the same direction as that of the lower slide plate 32 under the biasing force of the spring 33.

While the disc D is being played back, i.e., while the disc D is being clamped between the turntable 15 and the disc clamp 29, if the user operates the remote control unit F to switch from the disc playback mode to a radio reception mode or the user turns off the ignition key switch, then the disc D will remain clamped between the turntable 15 and the disc clamp 29. If the disc D remains clamped for a long period of time, and if the disc player is installed on an auto-mobile, then the outer peripheral edge of the disc D tends to droop due to solar heat applied to the disc player, and the disc D may not be played back again. If the disc D is a single CD and remains clamped for a long period of time in the automobile-mounted disc player, then the adapter attached to the outer periphery of the disc D is apt to fall off due to vibrations of the automobile, and may not be retrieved again.

To avoid the above problems, in the present invention, a plurality of switches $SW_1$, $SW_2$ and $SW_3$ are provided which are rendered ON/OFF in response to the movement of the upper slide plate 31. The combination of the switches generates output signal to the remote control unit F so as to send drive signal to the motor 16 which drives the control cam 18.

More specifically, as shown in FIGS. 2 and 4, position detector switches $SW_1$ through $SW_3$ which can be turned ON and OFF in response to movement of the upper slide plate 31 are mounted on the second chassis 19b. Each of the switches is biased to OFF position. That is, when the switch is in contact with the upper slide plate 31, the switch is turned ON against the biasing force, and when the upper slide plate 31 passes over the switch, the switch is turned OFF because of its biasing force.

When the upper slide plate 31 is in a standby position (FIGS. 2, 4 and 13(a)) in which the disc tray $C_1$ is not taken out of the magazine C, all the position detector switches $SW_1$ through $SW_3$ are turned ON.

When the disc tray $C_1$ is pushed out of the magazine C by a tray ejector arm 34 (described later) and the disc D on the disc tray $C_1$ reaches the position below the turntable 15, i.e., when the disc D and the disc tray are in a playback-standby position, the upper slide plate 31 is moved in the direction V in FIG. 2. In this instance, the position detector switches $SW_1$, $SW_2$ are turned OFF whereas the switches $SW_3$ maintains its ON position as shown in FIG. 13(b).

When the disc D is clamped between the turntable 15 and the disc clamp 29, all the position detector switches $SW_1$ through $SW_3$ turned OFF because of the further travel of the upper slide plate 31 as shown in FIG. 13(c).

If the user changes modes on the remote control unit F or turns off the ignition key switch when all the switches $SW_1$ through $SW_3$ are turned off (if the playback operation is not intended by the user even during the clamped state of the disc D), the remote control unit F issues a command signal to reverse the motor 16 to rotate the control cam 18 in the opposite direction to move the upper and lower slide plates 31, 32. When the upper slide plate 31 turns ON the switches $SW_2$, $SW_3$ because of the travel of the upper slide plate 31 in a direction opposite the direction V in FIG. 2 as shown in FIG. 13(d), the remote control unit F deenergizes the motor 16. When the switches $SW_2$, $SW_3$ are turned ON, the disc clamper 29 is lowered as shown in FIG. 7 to return the disc D onto the disc tray $C_1$. Therefore, the problems which would otherwise occur if the disc D remained clamped, as described above, are no longer caused.

With such arrangement of the switches, the third switch $SW_3$ can be referred to as a first switch means for detecting disc clamping state by the clamper and the turntable, and the second switch $SW_2$ can be referred to as a second switch means for detecting a state where the disc D is mounted on the disc tray C1. That is, if the disc playback mode is switched into a radio reception mode by the remote control unit F or if the ignition key of the vehicle is turned off (power supply to the player housing is terminated) even during the disc clamping state which state is detected by the first switch means SW3, the clamper 29 is moved downwardly until the disc D is mounted onto the disc tray $C_1$ which state is detected by the second switch means $SW_2$. As a result, thermal deformation of the disc due to prolonged loading of the disc can be avoided, and the disc tray can be correctly returned back into the magazine, since the disc tray retrieval can be achieved.

Incidentally, the two slide plates, i.e., the upper and lower slide plates 31, 32 are employed for the following reasons. Even after the ejection of the disc tray $C_1$ by the upper slide plate 31 is completed, only the lower slide plate 32 can be moved to allow the control cam 18 to rotate excessively. Therefore, the first turn plate 20 can be turned excessively to permit the horizontal plates 27b of the disc holders 27 to be completely separated from the disc C which has been clamped between the turntable 15 and the disc clamp 29.

Next, a mechanism for moving the disc tray $C_1$ will be described. This mechanism is operated after the magazine C is inserted into the player housing B, and is adapted for ejecting one of the disc trays mounting thereon a selected disc, and for returning the disc tray back into the magazine.

After the playback operation, the disc D is unclamped by the downward travel of the clamper, so that the disc D is mounted on a recessed portion $C_1'$ of the disc tray $C_1$. Then, the disc tray $C_1$ is returned back to the magazine C. In this case, if the disc D is inaccurately seated onto the recessed portion $C_1'$ due to vibration of an automobile, the disc D may be sandwitched between the planar end of the other disc tray already accommodated in the case $C_3$ and the exact tray mounting the disc D, or the disc D may be sandwitched between an open end face of the case $C_3$ of the magazine C and the exact disc tray mounting the disc D. As a result, the disc tray cannot be accommodated into the magazine C, and subsequent playback may not be attainable.

Figure 12A:
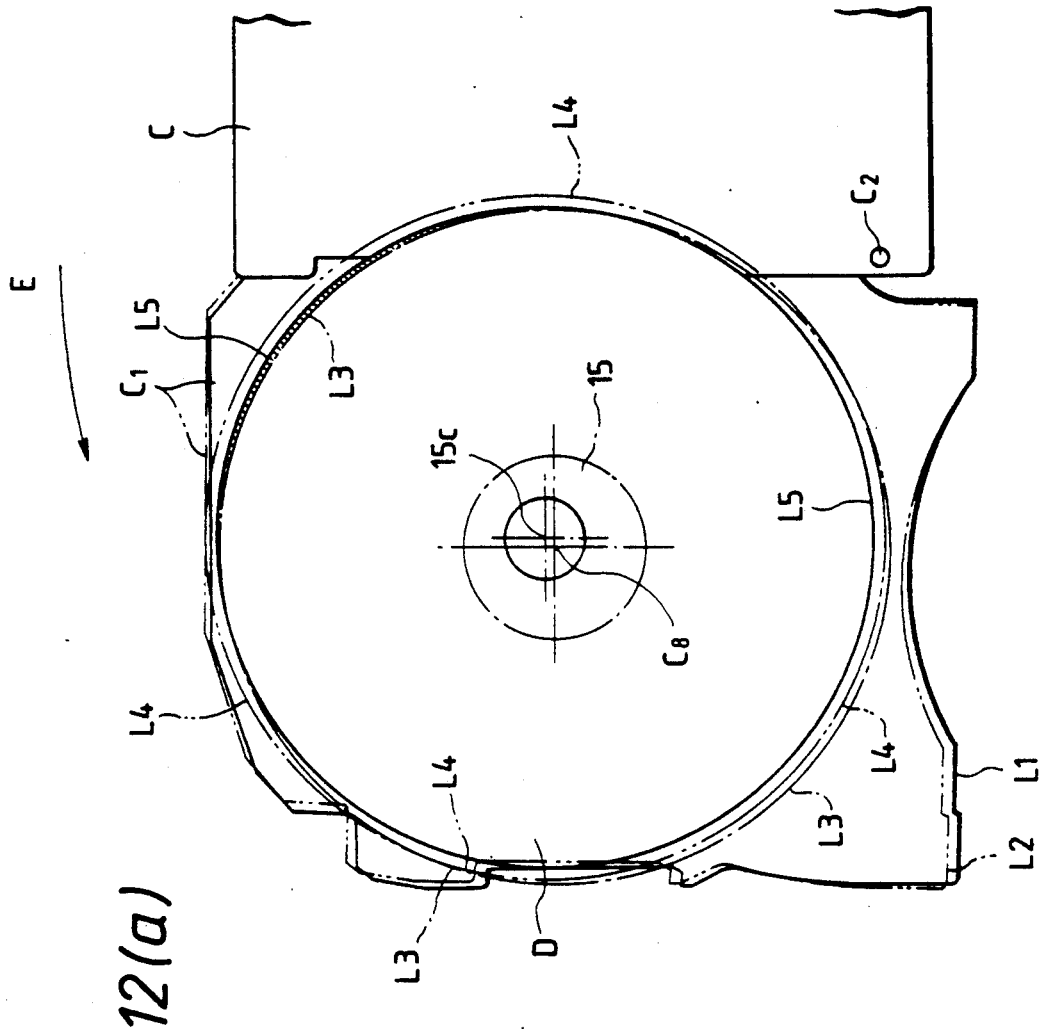
FIG. 12(a) is a plan view showing a positional relationship between a disc tray and a turntable.
Figure 12B:
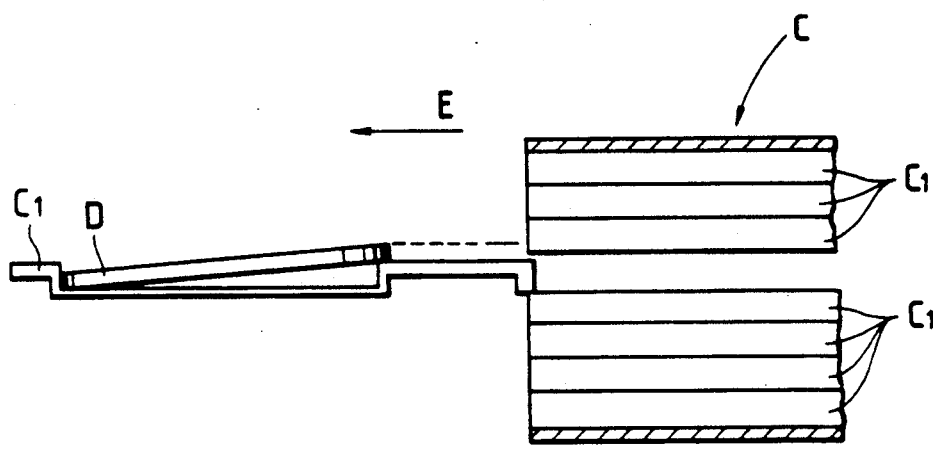
FIG. 12(b) is a cross-sectional view showing the positional relationship between the disc tray and a disc in return stroke of the disc tray according to the present invention.
Figure 12C:
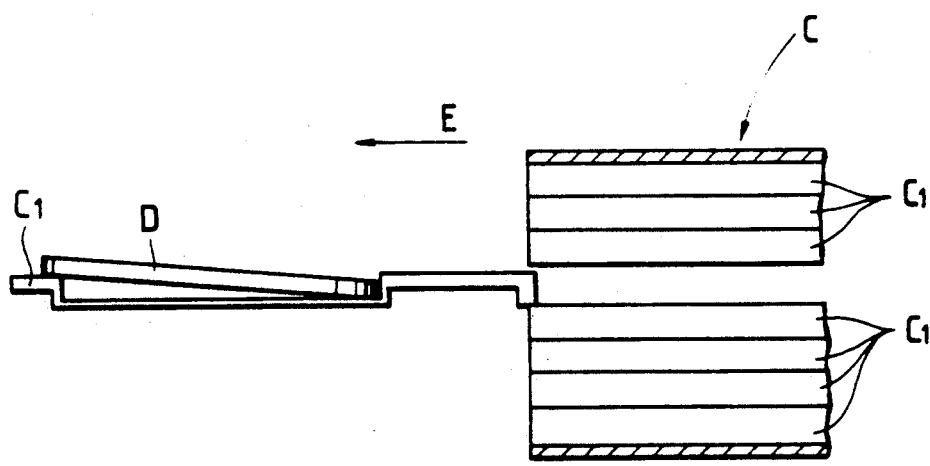
FIG. 12(c) is a cross-sectional view showing an undue positional relationship between the disc tray and the disc in return stroke of the disc tray.

For example, as shown in FIG. 12 (c), if an edge of the disc D rides over the edge of the recessed portion $C_1'$ which edge is positioned at extreme side with respect to the ejecting direction E in FIGS. 12(a) and 12(c), remaining edge of the disc D cannot be abutted onto the planar end of the other disc tray accommodated in the case $C_3$. On the other hand, if an edge of the disc D rides over the edge of the recessed portion $C_1'$ which edge of the recess is positioned at the nearest side with respect to the magazine as shown in FIG. 12(b), the edge of the disc can be abutted on the planar end of the other disc tray during return stroke of the disc tray, so that the disc can be correctly seated into the recessed position C1', and the disc tray can be again accommodated into the case C3 of the magazine C. In the present invention, the latter case (FIG. 12(b)) is contemplated.

In a disc tray moving mechanism according to this invention, there is provided the tray ejector arm 34 as shown in FIGS. 2 and 4. The tray ejector arm 34 has a substantially L-shaped configuration, and is rotatably supported on the second chassis 19b. The arm 34 has one end portion 34a engaging the upper slide plate 31. Upon movement of the upper slide plate 31 in V direction, the tray ejector arm 34 is pivotally moved in a direction indicated by an arrow S in FIG. 4 to move another end 34b into the window $C_5$ in the magazine C set in the magazine holder 3 and cause the end 34b to push and pivotally move the disc tray $C_1$ out of the case $C_3$ about the pivot portion $C_2$. As a result, the disc tray together with the disc D are positioned between first and second chassises 19a and 19b.

Importantly, at this time, the disc tray $C_1$ is turned slightly excessively so as to position the center of the disc tray $C_1$ ahead of the center of the turntable 15 in the direction in which the disc tray $C_1$ is pushed out. That is, as shown in FIG. 12(a), the center $C_8$ of the disc tray is not coaxial with the center 15C of the turntable 15, but the tray center $C_8$ slightly passes over the center 15C of the turntable so that the tray is finally positioned exceeding the turntable center with respect to the ejecting direction E. Incidentally, in FIG. 12(a), a line L1 indicates the exceeding position of the disc tray, a line L2 indicates coaxial position of the tray with respect to the turntable center 15C, a line L3 indicates the exceeding position of the recess C1' of the disc tray, a line L4 indicates a position of the recess C1' coaxial with the turntable center 15C, and a line L5 indicates the disc edge line which may be coaxial with the turntable center 15C.

Therefore, when the disc D is lowered upon retracted movement of the disc clamper 29, the disc D is placed on the disc tray $C_1$ at an off-center position displaced in the direction in which the disc tray $C_1$ is to be returned into the magazine C, as indicated by the solid line in FIG. 12. That is, a hatching portion of in FIG. 12(a) indicates an area where the disc rides over the edge of the recess C1'.

When the upper slide plate 31 is moved in the opposite direction (in the direction opposite the arrow V in FIG. 2), the pushed-out disc tray $C_1$ is pushed back into the case $C_3$ by a side face 34c of the tray ejector arm 34 because of the pivotal movement thereof in a direction opposite the arrow S. As the disc tray $C_1$ is stored back into the case $C_3$, the disc D that has been positioned over the edge line of the recessed portion C1' of the disc tray $C_1$ is abutted with the planar end face of the other disc tray or with the end face of the case $C_3$ and can be moved back into the recess C1'. Thus, the disc tray $C_1$ can reliably be stored back into the case $C_3$.

Figure 9:
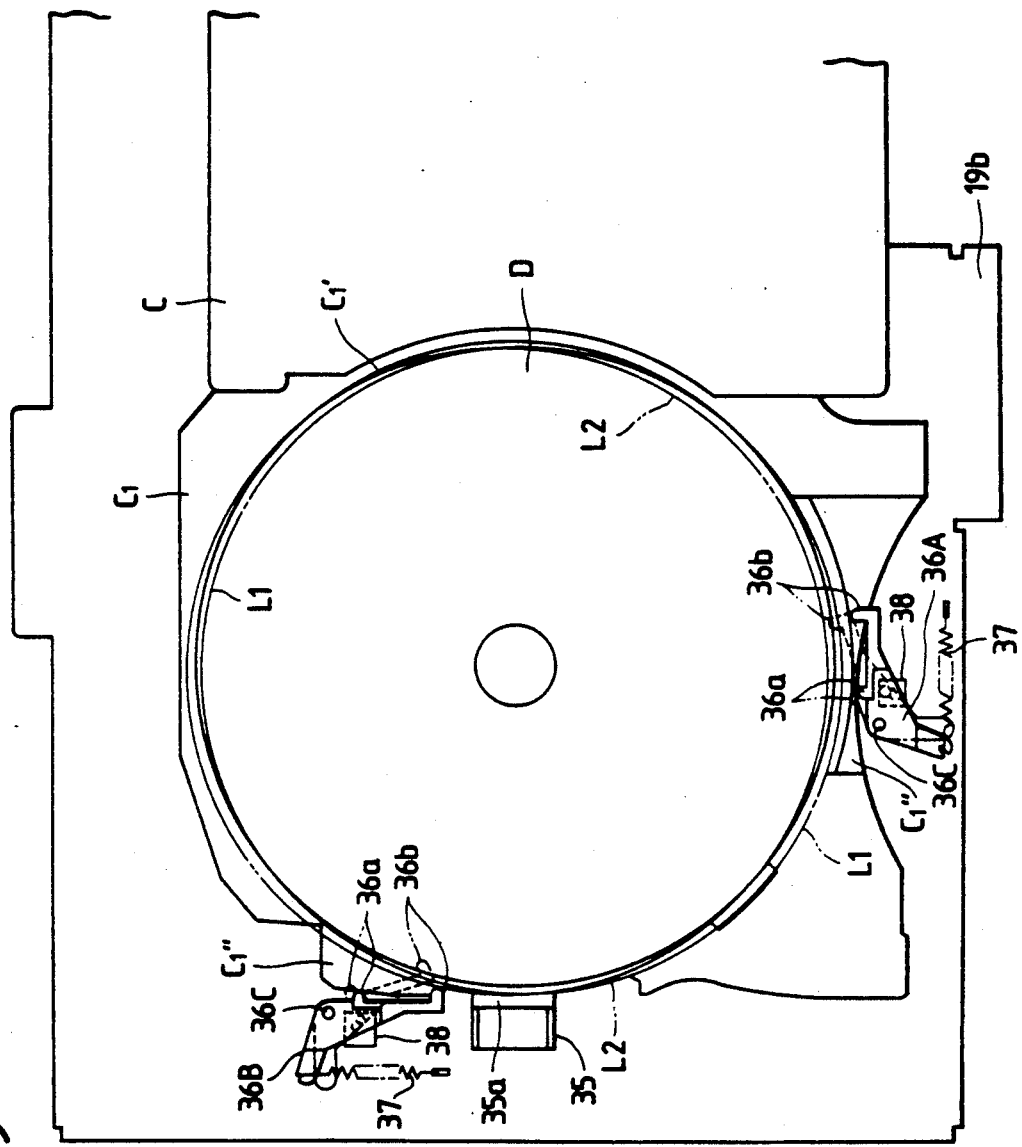
FIG. 9 is a plan view showing parts in the player housing at the time a disc tray is pushed out.
Figure 10:
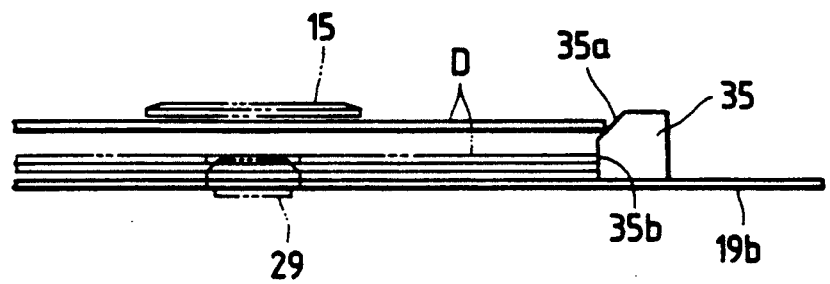
FIG. 10 is a side elevational view showing a disc return guide in FIG. 9.

FIGS. 2, 9 and 10 show a disc return guide 35 made of synthetic resin and fixedly mounted on the second chassis 19b. The disc return guide 35 is positioned at a position corresponding to a leading peripheral edge of the disc D placed on the disc tray $C_1$ that has been ejected from the magazine C. The disc return guide 35 has an upper tapered surface 35a spaced from the leading peripheral edge of the disc D which is properly placed on the disc tray $C_1$. The disc return guide 35 also has a vertical surface 35b extending downwardly from the tapered surface 35a and substantially aligned vertically with the leading peripheral edge of the disc D properly placed on the disc tray $C_1$.

Even if the disc D is positionally displaced owing to vibrations or the like, as shown in FIG. 9, when it is lowered back onto the disc tray $C_1$ after the disc D has been played back, the disc D is moved back to the normal position on the disc tray $C_1$ by the tapered surface 35a of the disc return guide 35, and is kept in the normal position by the vertical surface 35b.

According to this embodiment, there is further provided a disc position control mechanism when returning the disc onto the disc tray. As described above, the disc D is obliquely seated onto the disc tray as shown in FIG. 12(b). However, if the disc is seated in a manner other than the state shown in FIG. 12(b) in spite of the excessive angular movement of the disc tray, the above-described drawbacks may occur. Therefore, in the present invention, the disc position control mechanism is provided for correctly seating the disc onto the disc tray after release of the disc from the clamper.

Figure 11:
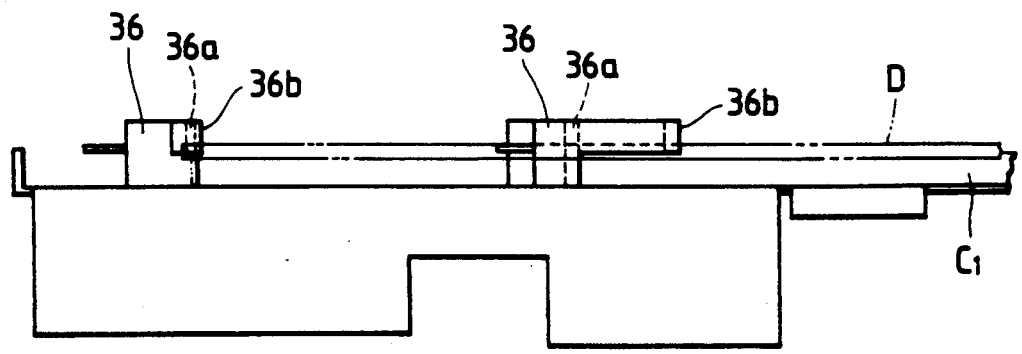
FIG. 11 is a side elevational view showing disc return arms in FIG. 9.

More specifically, as shown in FIGS. 9 and 11, a pair of disc return arms 36A, 36B are rotatably supported on the second chassis 19b by pivot pins 36c. The disc return arms 36A, 36B are disposed at two 90°-spaced positions, respectively, one (36A) being positioned at a foremost edge of the disc tray $C_1$ in the direction in which it is pushed out of the magazine C and the other (36B) being positioned at a leading edge of the disc tray $C_1$. The disc return arms 36A and 36B are normally urged to turn counter-clockwise (FIG. 9) by respective springs 37 interposed between the disc return arms 36 and the second chassis 19b. Each of the disc return arms 36 has two spaced teeth 36a, 36b. One tooth 36a which is closer to the pivot 36c of the disc return arm 36 is positioned so that it engages a projecting edge C1'' of the disc tray $C_1$ when the disc tray $C_1$ is fully pushed out of the magazine C. Regarding the disc return arm 36A, when the disc tray $C_1$ is turned back into the case $C_3$, the projection 36a of the disc return arm 36A is disengaged from the projecting edges C1'' of the disc tray $C_1$. The disc return arm 36A is then turned counter-clockwise under the force of the spring 37. The other projection 36b of the disc return arm 36A is moved toward the disc tray $C_1$ to push the edge of the disc D which may not be properly placed on the disc tray $C_1$ as indicated by a dotted chain line (line L1), so that the disc D will be properly positioned on the disc tray $C_1$.

The same is true with respect to the other disc return arm 36B. That is, if the disc D is improperly seated leftwardly with respect to the recess C1' as shown by two-dotted chain line (line L2) in FIG. 9, one tooth 36a which is closer to the pivot 36c of the disc return arm 36B is positioned so that it engages a projecting edge C1'' of the disc tray $C_1$ when the disc tray $C_1$ is fully pushed out of the magazine C. When the disc tray $C_1$ is turned back into the case $C_3$, the projection 36a of the disc return arm 36B is disengaged from the projecting edges C1'' of the disc tray $C_1$. The disc return arm 36B is then turned counter-clockwise under the force of the spring 37. The other projection 36b of the disc return arm 36B is moved toward the disc tray $C_1$ to push the edge of the disc D which may not be properly placed on the disc tray $C_1$.

The disc return arms 36 are prevented by stops 38 extending from the second chassis 19b from being turned excessively by the biasing force of the springs 37.

Overall operation of the disc player will be described below.

When the magazine C is inserted into the magazine holder 3, the magazine ejector arm 6 is turned by the front surface $C_7$ (FIG. 5) of the magazine C. In this case, if the magazine C is inserted upside down, the upstanding member 6c engages the step $C_6$ (FIG. 6), so that the magazine ejector arm 6 cannot be turned any more. Therefore, erroenous insertion of the magazine is avoidable.

When the magazine ejector arm 6 reaches the end of its turning stroke, the engaging arm 8 (FIG. 2) engages the hole $C_4$ in the magazine C to lock the magazine C into place in the magazine holder 3.

The remote control unit F (FIG. 1) is then operated to select a desired disc D to be played back. The motor 12a (FIG. 2) is energized to move the slide plate 5. At this time, the slide plate 4 is also moved through the synchronizing plate 11. The magazine holder 3 is vertically moved while being guided by the cam grooves (5a in FIG. 3) defined in the slide plates 4, 5, until the disc tray $C_1$ supporting the desired disc D thereon is aligned with the tray ejector arm 34, whereupon the magazine holder 3 is stopped.

Then, the motor 16 (FIG. 4) is energized to rotate the control cam 18. The upper and lower slide plates 31, 32 are moved to turn the tray ejector arm 34 in the direction S to push the disc tray $C_1$ out of the case $C_3$. When the central hole of the disc D on the disc tray $C_1$ is positioned below the turntable 15, the upper and lower slide plates 31, 32 are stopped. In this case, the stop position of the disc tray $C_1$ slightly exceeds the turntable 15.

The motor 16 is continuously energized to further rotate the control cam 18 until the roller 20a of the first turn plate 20 runs off the cam surface 18b. The disc clamp 29 is then moved toward the turntable 15 to clamp the disc D between the disc clamper 29 and the turntable 15. At this time, the disc clamper 29 is held horizontally by the clamp support member 30 until immediately before the disc clamper 29 and the turntable 15 clamp the disc D therebetween. When the first turn plate 20 is turned, the third turn plate 25 is turned through the connector plate 24 to translate the disc holder 27 upwardly. The disc holders 27 are held against the upper surface of the disc D which is moved upwardly by the disc clamper 29, thus holding the disc D parallel to and between the upper surface of the disc clamper 29 and the disc holders 27 and moving the disc D toward the turntable 15. Therefore, the disc D is finally clamped horizontally between the turntable 15 and the disc clamp 29. After the disc D has been clamped, the motor 13a is energized to move the pickup 13c for playing back the disc D.

While the disc D is being played back, i.e., while the disc D is being clamped between the turntable 15 and the disc clamper 29, all switches SW1 thru SW3 are rendered OFF (FIG. 13(c)). In this case, if the user operates the remote control unit F to switch from the disc playback mode to a radio reception mode or the user turns off the ignition key switch, the remote control unit F issues a command signal to reverse the motor 16 to rotate the control cam 18 in the opposite direction to move the upper and lower slide plates 31, 32. When the upper slide plate 31 turns on the switches SW2, SW3, the remote control unit F deenergizes the motor 16. When the switches SW2, SW3 are turned on, the disc clamper 29 is lowered as shown in FIG. 7 to return the disc D onto the disc tray $C_1$. Therefore, the problems which would otherwise occur if the disc D remained clamped, as described above, are no longer caused.

After the disc D has been played back, the above operation is reversed to return the disc D onto the disc tray $C_1$ and store the disc tray $C_1$ back into the case $C_3$ of the magazine C. The remote control unit F may then issue a command signal to move the magazine holder 3 vertically to select a desired disc D, and the above playback process may be repeated.

According to the present invention, even if the magazine is inserted upside down into the magazine holder, the magazine ejector arm is locked by the step on the front surface of the magazine, preventing the magazine from being further inserted into the magazine holder. Therefore, the various problems which would otherwise take place if the magazine were fully inserted upside down into the magazine holder, e.g., a failure to remove disc trays from the magazine holder, a failure to remove the magazine from the magazine holder, and damage of mechanical parts due to undue stresses applied thereto, can be solved.

Although a certain preferred embodiment has been shown and described, it should be understood that various changes and modifications may be made therein without departing from the spirit and scope of the invention.

What is claimed is:

1. A device for preventing a disc magazine from being inserted upside down into a disc player, the disc player including a magazine holder, the magazine supporting at least one disc tray for placing a disc thereon, the magazine being insertable into the magazine holder, means for taking the disc tray out of the magazine which is inserted in the magazine holder, a turntable, and playback means for playing back the disc; the device comprising:

a magazine ejector arm (6) pivotally disposed in said magazine holder (3);

biasing means (6b) connected to said magazine ejector arm (6) for normally urging said arm (6) to a direction to eject said magazine (C) out of said magazine holder (3), and said magazine (C) being provided with a front end having one portion formed with a surface ($C_7$) slidingly contactable with the magazine ejector arm (6) and another portion formed with a step ($C_6$), said ejector arm (6) providing a full pivoting stroke upon slide contact with said surface ($C_7$) against the biasing force of said biasing means (6b) to allow the magazine (C) to be fully inserted into said magazine holder, and said magazine ejector arm (6) having means for engaging said step ($C_6$) at an intermediate pivot position of said magazine ejector arm (6) so as to be in locking engagement with said step ($C_6$) for preventing the magazine (C) from being further inserted into said magazine holder (3).

2. The device as claimed in claim 1, wherein said magazine ejector arm (6) has a generally L-shaped configuration having one end (6d) pivotally supported to said magazine holder (3), another end portion formed with a gear (6a) and a corner portion integrally provided with said means for engaging said step ($C_6$), said means for engaging said step ($C_6$) comprising:

an upstanding member (6c), said upstanding member being in slide contact with said surface (C7) and being in locking engagement with said step (C6).

3. The device as claimed in claim 2, further comprising a damper means (7) disposed on said magazine holder (3), said damper means (7) being engageable with said gear (6a) for moderating the biasing force of said biasing means (6b).

4. A device for preventing a disc magazine from being inserted upside down into a disc player, the disc player including a magazine holder, the magazine supporting at least one disc tray for placing a disc thereon, the magazine being insertable into the magazine holder, means for taking the disc tray out of the magazine which is inserted in the magazine holder, a turntable, and playback means for playing back the disc; the device comprising:

a magazine ejector arm (6) pivotally disposed in said magazine holder (3);

biasing means (6b) connected to said magazine ejector arm (6) for normally urging said arm (6) to a direction to eject said magazine (C) out of said magazine holder (3), and said magazine (C) being provided with a front end having one portion formed with a surface (C7) slidingly contactable with the magazine ejector arm (6) and another portion formed with a step (C6), said ejector arm (6) providing a full pivoting stroke upon slide contact with said surface (C7) against the biasing force of said biasing means (6b) to allow the magazine (C) to be fully inserted into said magazine holder, and said magazine ejector arm (6) providing an intermediate pivot position upon locking engagement with said step (C6) for preventing the magazine (C) from being further inserted into said magazine holder (3), wherein said magazine ejector arm (6) has a generally L-shaped configuration having one end (6d) pivotally supported to said magazine holder (3), another end portion formed with a gear (6a) and a corner portion integrally provided with an upstanding member (6c), said upstanding member being in slide contact with said surface (C7) and being in locking engagement with said step (C6).

* * * * *